Oct. 27, 1964     H. W. BOTELER     3,154,289
DIAPHRAGM VALVES
Filed Oct. 10, 1961     2 Sheets-Sheet 1
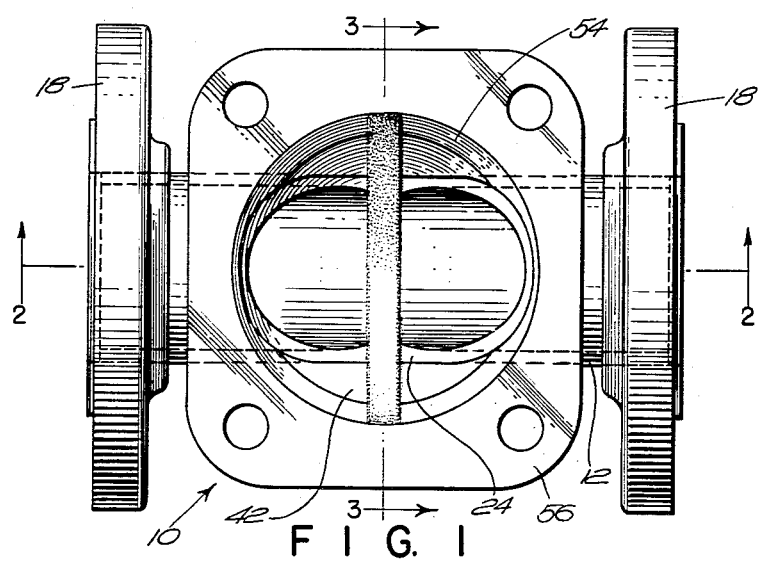
FIG. 1
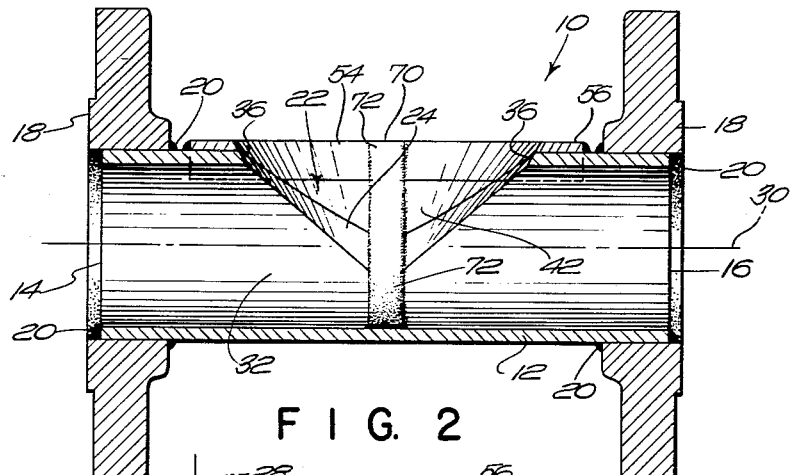
FIG. 2
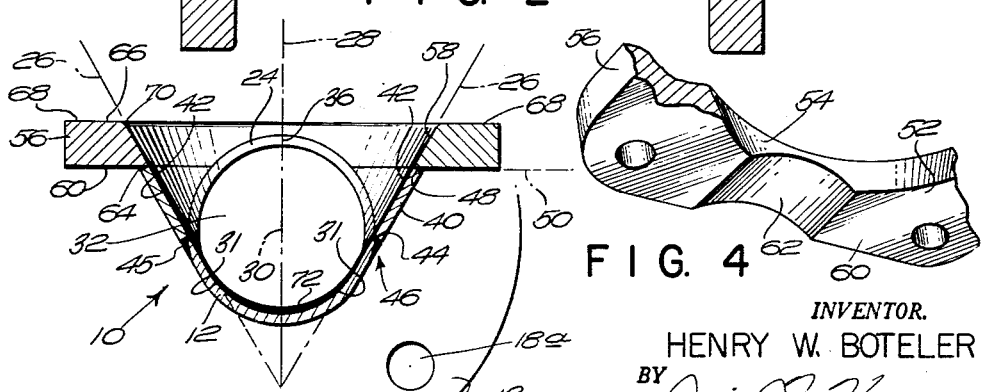
FIG. 3
FIG. 4
INVENTOR.
HENRY W. BOTELER
BY David M. Kenney
ATTORNEY Oct. 27, 1964    H. W. BOTELER    3,154,289
DIAPHRAGM VALVES Filed Oct. 10, 1961    2 Sheets-Sheet 2

INVENTOR.
HENRY W. BOTELER
BY
David L. McKenney
ATTORNEY

United States Patent Office

3,154,289
Patented Oct. 27, 1964

3,154,289
DIAPHRAGM VALVES
Henry W. Boteler, East Greenwich, R.I., assignor to Grinnell Corporation, Providence, R.I., a corporation of Delaware
Filed Oct. 10, 1961, Ser. No. 144,175
10 Claims. (Cl. 251—367)

This invention relates to improvements in diaphragm valves having substantially straight-through flow passageways. More particularly, it has to do with valves of this kind in which the bodies are fabricated in a novel way from a plurality of components formed from the commonly available rolled, extruded or forged metal shapes.

In recent years this type of diaphragm valve has enjoyed considerable popularity because its flow passageway is unobstructed when the valve is in open position. Thus the body of such a valve is essentially a cylinder with circular inlet and outlet openings at its opposite ends and with a side opening intersecting the straight cylindrical passageway which extends between these openings. Customarily this side opening is also circular and has a diameter somewhat larger than that of the flow passageway, so that the straight surfaces of the body extending from this side opening and merging substantially tangentially with the cylindrical surfaces of the flow passageway at the sides thereof have an inward and downward taper.

The side opening is preferably surrounded by an annular flange having a flat surface which is parallel to the passageway and against which the peripheral edge of a diaphragm is clamped, when the valve is assembled, by the lower end of a hollow bonnet housing the actuating mechanism. This actuating mechanism is connected to the bulged central portion of the diaphragm and serves both to move this portion into sealing engagement with the body walls to close the valve and to withdraw this portion into the interior of the bonnet to open the valve.

A past difficulty has arisen from the fact that bodies for this type of diaphragm valve have usually been formed by casting metal in the conventional manner. Such method of manufacture has been reasonably inexpensive where the bodies are not later intended to have their passageways glass-lined and where the metal cast is other than steel, but if the cast bodies are later lined with glass or if they are formed of steel thay have given a great deal of trouble.

With respect to the cast metal body which is intended to be glass-lined the reason for this trouble is that there is often enough porosity in any of the cast metals to produce some bubbling and blistering of the glass during the glass-lining process. With respect to the cast steel body the reason for this trouble is that this material is so porous that almost invariably a great deal of time must be spent after the body has been cast to repair by hand the voids appearing in and just under the passageway surfaces. This repair involves hand grinding the voids, filling the voids with weld metal, then grinding and polishing.

The present invention overcomes these difficulties by providing a novel diaphragm valve body which has a straight-through passageway and which is fabricated in a novel way from metal components formed from commonly available rolled, extruded or forged shapes. Thus, in a prefered embodiment of the invention the valve body is fabricated in the novel way by welding together pieces of steel pipe and steel plate. Because such pipe and plate which have been formed by a rolling, extruding or forging process are commonly available, the resulting valve body has little or no porosity in the surfaces of the flow passageway when such pipe and plate are used. As a consequence, the repair work referred to earlier need not be undertaken to produce a satisfactory finished steel body, and in the case of bodies which are later glass-lined no bubbles or blisters will appear in the glass lining.

The pieces employed in the preferred embodiment are as follows: First a pipe segment with an opening cut in its side intermediate its ends. This cut is along the line of intersection of the pipe segment external surface by a right circular cone having an axis of revolution perpendicular to and intersecting the pipe segment axis and having sides which, at the opposite sides of the pipe segment, merge substantially tangentially with the interior surface thereof. In addition, the walls of this opening lie in the sides of this cone to form the lower end portions of the tapered surfaces. A pair of curved side plates having interior surfaces lying in the sides of this cone form the middle portions of the tapered surfaces at the opposite sides of the segment. The diaphragm opening in the body is provided by a circular opening through the center of a relatively thick flang plate, and the walls of this opening also lie in the sides of the cone to form the upper portions of the tapered surfaces. The side plates are preferably welded to both the pipe segment and to the flange plate around the respective openings therein.

It is an object of the present invention to provide a fabricated diaphragm valve body which has a straight-through flow passageway and which is simple in design and construction, and inexpensive to manufacture.

Another object is to provide a diaphragm valve body of this type which is formed by securing together components of simple but particular shape.

Another object is to provide a diaphragm valve body of this type which is formed by welding or similarly fastening together a plurality of metal components which are of simple but particular shape and which are formed from standard rolled, extruded or forged metal shapes.

Another object is to provide a diaphragm valve body of this type which is formed by welding or similarly fastening together a segment of metal pipe, a pair of curved metal side plates and a flat metal flange plate.

Another object of the invention is to provide a diaphragm valve body of this type in which the curved side plates are fastened to the exterior surface of the pipe segment.

Another object of the present invention is to provide a diaphragm valve body of the kind described in which the curved side plates are fastened to the exterior surface of the pipe segment around an opening in this segment whereby the walls of the segment opening define a portion of the body flow passageway.

Another object of the present invention is to provide a diaphragm valve body of the kind described in which a narrow shallow diaphragm seating strip is provided across at least the interior surface of the pipe segment by the deposit of a layer of weld or braze metal.

Another object of the present invention is to provide a diaphragm valve body of the kind described in which the curved side plates are spaced outwardly somewhat from the segment opening whereby the walls of this opening form at least a portion of the raised diaphragm seating.

Other objects will appear hereinafter.

The best modes in which it has been contemplated applying the principles of the present invention are shown in the accompanying drawings, but these are to be deemed primarily illustrative, for it is intended that the patent shall cover by suitable expression in the appended claims whatever of patentable novelty exists in the invention disclosed.

In the drawings:
FIGURE 1 is a top plane view of one embodiment of the present invention;

FIGURE 2 is a cross-sectioned side elevation view of the body of FIG. 1 taken on line 2—2 of FIG. 1;

FIGURE 3 is a cross-sectioned end elevation view of the body of FIG. 1 taken on line 3—3 of FIG. 1;

FIGURE 4 is a fragmentary perspective view of a portion of the flange plate used in the embodiment of FIGS. 1–3;

Figure 5:
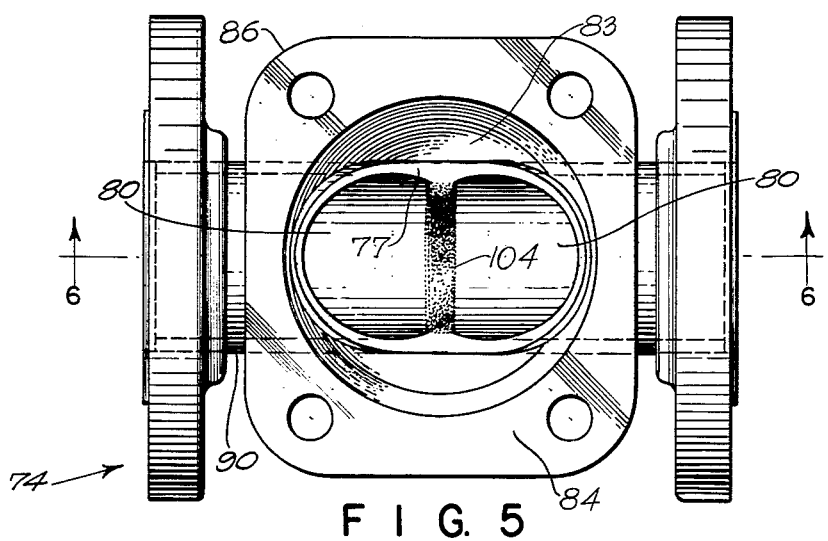
FIGURE 5 is a top plane view of another embodiment of the present invention.
Figure 6:
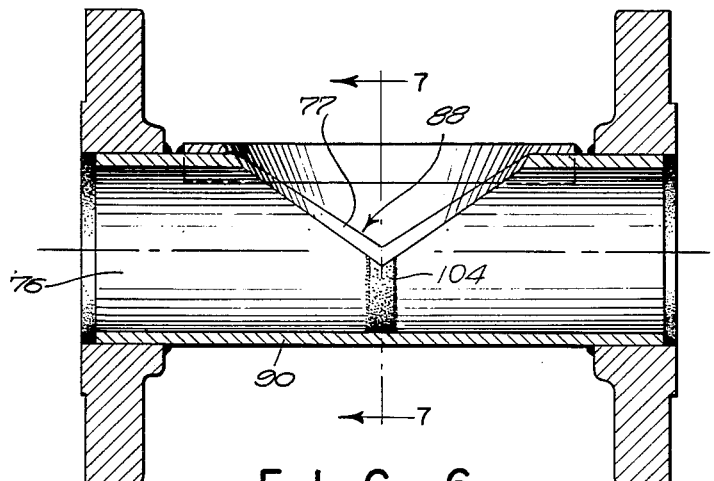
Figure 7:
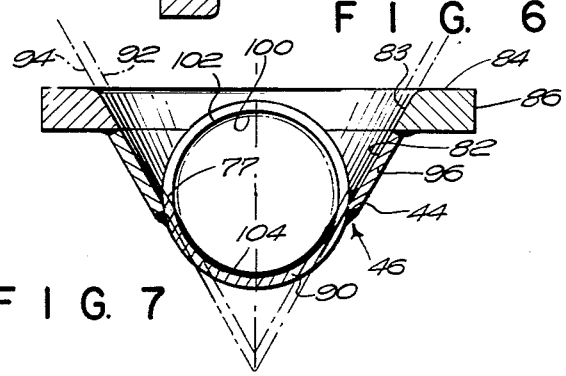
Figure 8:

FIGURES 6 and 7 are other views of this embodiment which correspond to FIGS. 2 and 3 and which are taken on lines 6—6 and 7—7, respectively, of FIG. 5; and FIGURE 8 is a perspective view of one of the curved side plates employed in these embodiments.

Referring now more particularly to the drawings. The diaphragm valve body 10 in the embodiment of FIGS. 1–3 comprises a short section or segment of straight steel pipe 12 having squared-off ends 14 and 16 ends of which is provided with a forged steel end flange 18 fitting nicely thereover and secured thereto in a convenient fashion, for example by welds 20. These flanges are conventional piping accessories and serve in this case as structure for installing the valve body in a pipe line in which the pipe lengths are themselves provided with such flanges. Bolt and nut assemblies (not shown) adapted to pass through flange holes 18a secure these valve and pipe flanges together.

Intermediate the end flanges 18 the pipe segment 12 is provided with a diaphragm opening 22, hereafter at times referred to as the pipe segment diaphragm opening, having walls 24 which coincide with the surface of an imaginary right circular cone 26 indicated in dot-dash lines. This cone is formed about an axis 28 which perpendicularly intersects the axis 30 of the cylindrical segment passageway 32, and the segment diaphragm opening walls 24 are tangent to the interior surface of the pipe section at points 31 on opposite sides thereof. This is best illustrated in FIG. 3.

The segment diaphragm opening 22 in the side of the pipe segment 12 dips rather far down opposite sides of this segment toward the tangency points 31 and from the vicinity of these points curves upwardly to the top of the pipe segment at points 36 above the axis 30 thereof.

In order to form a diaphragm valve body of the straight-through type (like those which have heretofore been made of cast metal) the usual surfaces tapering inwardly and downwardly from the diaphragm opening are supplied in part in this embodiment by a pair of side plates 40 which are curved to have their interior surfaces 42 coincide with the surface of the cone 26 and which have their lower extremities adjacent lower edges 44 shaped to lie nicely against the exterior surface of the pipe segment 12 around the diaphragm opening 22 therein. These lower edges 44 are welded at 45 to this pipe segment exterior surface, and a chamfer is provided if necessary to facilitate the proper penetration of molten weld material. By so forming the lower side plate edge 44, preferably, substantially perpendicular to the interior and exterior surfaces, instead of fitting it exactly against the pipe segment exterior surface, it forms therewith a tapered weld metal receiving crevice 46.

The upper edges 48 of these side plates 40 lie in a plane 50 and define a circular lip receiving thereon the lower rim 52 of the diaphragm opening 54 in a flange plate 56. This opening, hereafter at times referred to as the flange plate diaphragm opening, also has tapered walls 58 coinciding with the surface of the cone 26. In the vicinity of the points 36 the underside 60 of the plate 56 is notched at 62 so as to receive the pipe segment. At this location the flange plate is welded directly to the pipe segment. Elsewhere the upper edges 48 of the side plates are welded at 64 to the underside 60 of the flange plate at the rim 52 of the opening therein. By proper formation of the edges 48 a tapered crevice is again provided, if necessary to facilitate such welding.

In this embodiment of FIG. 1–3 the seating of the diaphragm (the diaphragm is not shown) takes place along a narrow band starting at a point 66 on the flange plate diaphragm clamping surface 68, extending over the upper edge 70 of the flange plate opening 54, extending down the flange plate opening wall 58, extending down the side plate interior surface 42, extending across the interior cylindrical surface of the pipe segment passageway 32, and then extending up the opposite side in a similar manner. By far the best results are obtained when a shallow ridge 72 is formed by the deposit of extra weld metal, as shown, to assure that the seating will be continuous along this line and that it will be sufficiently tight when the diaphragm is pressed against it.

In the embodiment of FIGS. 5–7 the body 74 is also of the type having a straight-through passageway 76, but in this case the diaphragm seating is formed in part on the entire wall 77 of the diaphragm opening 70 instead of on the sloping interior side plate surfaces 82, the flange plate diaphragm opening walls 83 and the flange plate surface 84. To accomplish this second embodiment it is merely necessary to form the walls 77 of the segment diaphragm opening 80 in the surface of a cone 92 which is slightly smaller than, but parallel to, a cone 94 defined by the interior surfaces 82 of the side plates 96 and by the flange plate diaphragm opening walls 83.

One way of accomplishing this result is to cut the segment diaphragm opening 80 so that the cone formed by the walls 77 of this cut is tangent to a circle 100 somewhat smaller than the circle 102 which defines the interior surface of the pipe segment. Then the interior surface of the pipe segment 90 is built up with the weld deposit to form a narrow shallow seating strip 104 across the bottom of this segment, the cone 92 of the segment opening walls being tangent to the smaller circle 100, which in turn coincides with the surface of the built-up weld strip 104.

The use of the terms "upper" and "lower" in the following claims is intended to merely simplify the recitation of the relationship of the parts with each other and is not intended to fix the orientation of the parts in space.

I claim:

1. A fabricated diaphgram valve body having a flow passageway therethrough, said body comprisnig:

(I) a straight pipe segment having:
  (A) a pair of ends,
  (B) an exterior surface,
  (C) an interior surface defining part of said passageway,
  (D) a segment diaphragm opening having:
    (1) a location intermediate said segment ends,
    (2) walls which extend between said exterior and interior segment surfaces and which define part of said passageway, (II) a flange plate over said diaphragm opening being welded to a portion of said pipe segment and having:
  (A) one side forming a plane surface presented away from said segment diaphragm opening,
  (B) a side opposite said one side presented toward said segment diaphragm opening,
  (C) a flange plate diaphragm opening:
    (1) in register with said segment diaphragm opening,
    (2) having walls extending between said flange plate surfaces and defining part of said passageway, (III) at least one side plate welded to said straight pipe segment and said flange plate having:
  (A) an interior and exterior surface:
    (1) said interior surface defining part of said passageway
  (B) a lower edge portion extending between said interior and exterior surfaces substantially at right angles to both surfaces, (C) the lower extremity of said interior surface abutting and conforming to a portion of said exterior segment surface adjacent said segment diaphragm opening whereby the exterior pipe segment surface and said lower edge portion of said side plate form a weld metal receiving crevice, (D) the upper extremity of said interior surface abutting and conforming to a portion of the surface of said flange plate side opposite said one side and being:

(1) contiguous to the edge of said flange plate diaphragm opening formed by the intersection of said diaphragm opening wall and said surface of said flange plate side opposite said one side.

2. A diaphragm valve body according to claim 1 in which said segment diaphragm opening walls and said flange plate diaphragm opening walls and said side plate surface taper outwardly from said segment interior surface.

3. A diaphragm valve body according to claim 1 in which:

(I) said segment interior surface is cylindrical,
(II) said segment diaphragm opening walls lie in a cone-shaped surface which is tangent to said segment interior surface at the sides of said segment.

4. A diaphragm valve body according to claim 1 in which:

(I) said segment interior surface is cylindrical,
(II) said segment diaphragm opening walls and said flange plate diaphragm opening walls and said side plate surface form a cone-shaped surface which is tangent to said segment interior surface at the sides of said segment.

5. A diaphragm valve body according to claim 4 in which said cone-shaped surface has thereon an elognated raised seating strip which extends between opposite points on said flange plate diaphragm opening walls.

6. A diaphragm valve body according to claim 1 in which:

(I) there is located on said segment interior surface a raised seating strip which:

(A) extends across said segment interior surface from a portion of the segment diaphragm opening wall on one side of said segment to an opposite portion of the segment diaphragm opening wall on the opposite side of the segment,
(B) has a cylindrical surface, (II) said segment diaphragm opening walls lie in a cone-shaped surface which is tangent to said cylindrical surface said strip at sail segment diaphragm opening wall portions.

7. A diaphragm valve body according to claim 1 in which:

(I) said segment diaphragm opening walls lie in a first cone-shaped surface,
(II) said side plate surface and said flange plate diaphragm opening walls lie in at least one other cone-shaped surface which:
(A) is concentric to said first cone-shaped surface,
(B) larger than said first cone-shaped surface.

8. A diaphragm valve body according to claim 1 in which:

(I) said segment interior surface has thereon a raised seating strip which:

(A) extends across said segment interior surface from a portion of the segment diaphragm opening wall on one side of said segment to an opposite portion of the segment diaphragm opening wall
(B) has a cylindrical surface, (II) said segment diaphragm opening wall lies in a first cone-shaped surface which is tangent to the said cylindrical surface of said seating strip at said segment diaphragm opening wall portions, (III) said side plate surface and said flange plate diaphragm opening walls lie in a second cone-shaped surface which:
(A) is concentric to said first cone-shaped surface,
(B) is larger than said first cone-shaped surface,
(C) is parallel to said first cone-shaped surface.

9. A diaphragm valve body according to claim 1 in which:

(I) said opposite flange plate side is notched on opposite sides of said flange plate diaphragm opening,
(II) said flange plate notches fit the segment exterior surface.

10. A diaphragm valve body comprising:

(I) a straight pipe segment having:
(A) a pair of ends,
(B) a cylindrical exterior surface,
(C) a cylindrical interior surface which is parallel to said exterior surface,
(D) a longitudinal axis,
(E) a diaphragm opening having:
(1) a location intermediate said segment ends,
(2) walls which:
(a) extend between said exterior and interior surfaces,
(b) substantially coincide with the intersection of said segment by a cone-shaped surface whch:
(i) has its principal axis substantially perpendicular to and passing substantially through said segment longitudinal axis,
(ii) has its sides converging toward said segment diaphragm opening,
(iii) is generally tangent to said segment interior surface on opposite sides of said segment, (II) a flange plate over said segment diaphragm opening being welded to a portion of said pipe segment and having:
(A) one side forming a flat plane surface which:
(1) is substantially perpendicular to said cone axis,
(2) is presented away from said segment diaphragm opening,
(B) a side opposite said one side presented toward said segment diaphragm opening,
(C) a diaphragm opening which:
(1) registers with said segment diaphragm opening,
(2) has walls which:
(i) extend between said flange plate surfaces, and define part of said passageway,
(ii) substantially coincide with a portion of said cone surface, (III) two side plates welded to said straight pipe segment and said flange plate, each side plate having:
(A) an interior and exterior surface,
(1) said interior surface defining part of said passageway and
(a) coinciding with another portion of said cone surface,
(B) a lower edge portion extending between said interior and exterior surfaces substantially at right angles to both surfaces,
(C) the lower extremity of said interior surface abutting and conforming to a portion of said exterior segment surface adjacent said segment diaphragm opening whereby the exterior pipe segment surface and said lower edge portion of said side plate form a weld metal receiving crevice, (D) the upper extremity of said interior surface abutting and conforming to a portion of the surface of said flange plate side opposite said one side and being,
   (1) continguous to the edge of said flange plate diaphgram opening formed by the intersection of said diaphragm opening wall and said surface of said flange plate side opposite said one side, whereby a flow passageway in the body is defined by: said interior segment surface, said segment diaphragm opening walls, said side plate surface and said flange plate diaphragm opening walls.

References Cited in the file of this patent

UNITED STATES PATENTS

| | | |
|---|---|---|
| 2,429,602 | Boteler | Oct. 28, 1947 |
| 2,963,266 | Boteler | Dec. 6, 1960 |